United States Patent [19]

Hattori et al.

[11] Patent Number: 4,719,555

[45] Date of Patent: Jan. 12, 1988

[54] ELECTRIC POWER CONTROL APPARATUS WITH FIRST AND SECOND FIXED TIME INTERVALS

[75] Inventors: Motonobu Hattori, Funabashi; Noritoshi Tuji, Narashino; Hideyuki Shimonabe, Chiba, all of Japan

[73] Assignee: Hitachi, Ltd., Tokyo, Japan

[21] Appl. No.: 810,297

[22] Filed: Dec. 18, 1985

[51] Int. Cl.⁴ .......................................... H02H 7/122
[52] U.S. Cl. ........................................ 363/56; 363/37
[58] Field of Search ................... 363/37, 56, 57, 58, 363/98, 132, 137

[56] References Cited

U.S. PATENT DOCUMENTS

| | | | |
|---|---|---|---|
| 4,237,531 | 12/1980 | Cutler et al. | 363/37 X |
| 4,376,968 | 3/1983 | Wueschinski et al. | 363/37 |
| 4,410,935 | 10/1983 | Dang | 363/37 |
| 4,520,437 | 5/1985 | Boettcher et al. | 363/98 X |
| 4,589,050 | 5/1986 | Cutler et al. | 363/57 X |

Primary Examiner—Patrick R. Salce
Assistant Examiner—Marc S. Hoff
Attorney, Agent, or Firm—Antonelli, Terry & Wands

[57] ABSTRACT

When an abnormality is detected during driving of an inverter, the output of the inverter is interrupted for a period of several milliseconds and then operated again. At this time, if no abnormality is detected, driving is continued, while if an abnormality is again detected, driving is stopped.

2 Claims, 9 Drawing Figures

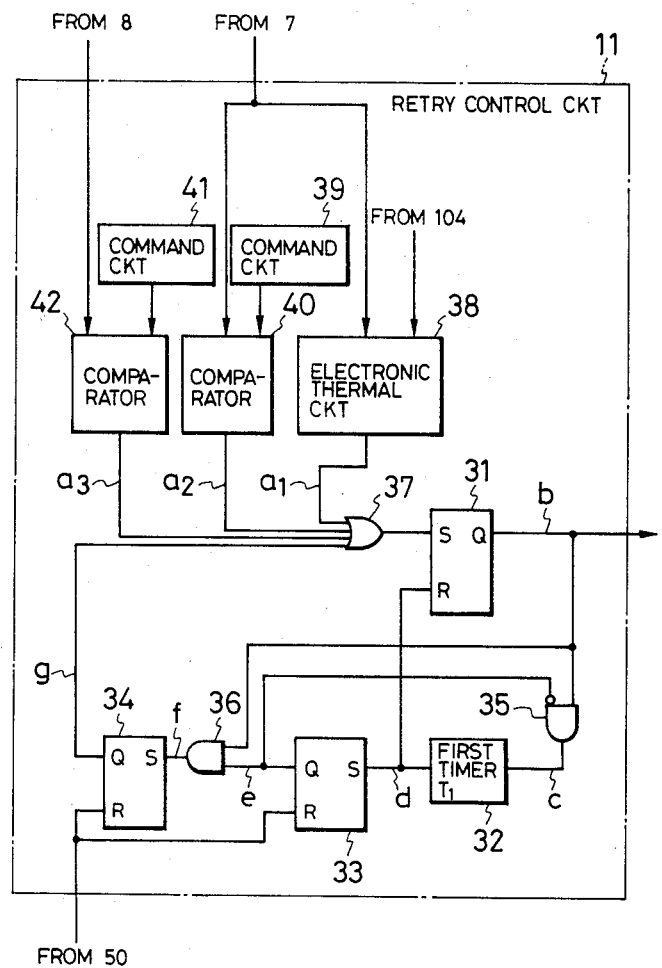

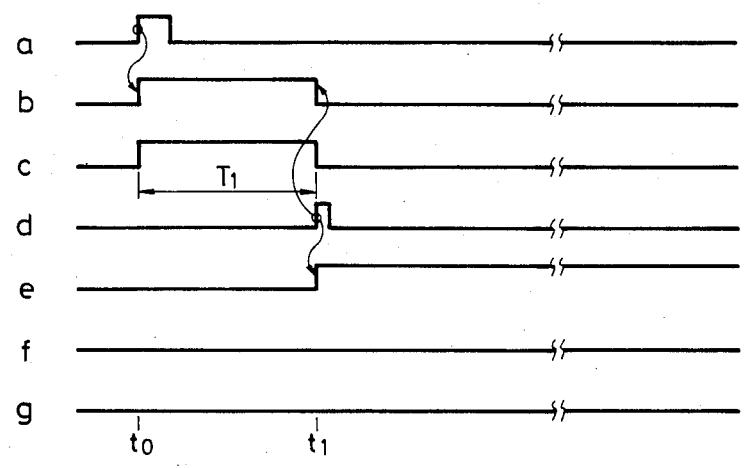
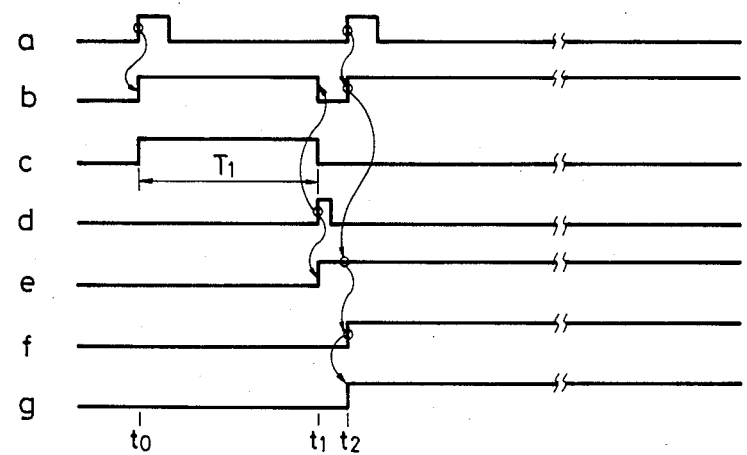

ELECTRIC POWER CONTROL APPARATUS WITH FIRST AND SECOND FIXED TIME INTERVALS

BACKGROUND OF THE INVENTION

1. Field of the Invention

The present invention relates to an electric power control apparatus, particularly to an inverter which converts DC electric power into AC electric power.

2. Description of the Prior Art

An inverter apparatus uses semiconductor elements such as a transistor and a thyristor, and thus has a relatively small thermal overload capacity, as well as having weak resistance to surge. Therefore, it is generally provided with a protective capability which functions to interrupt output with a relatively short rise in voltage/current when abnormalities such as abnormal rises in output voltage and electric current are produced.

However, the conventional inverter apparatus involves the problem that the protective capability is likely to function when transient abnormalities are produced by noise, and operation is consequently stopped on such occasions.

Thus, as described in Japanese Patent Publication No. 20273/1984, it has been proposed that such abnormalities be observed and inhibited immediately after the signs of the abnormalities are detected so as to prevent the occurrence of output interruption. This proposition involves observation of the voltage on the output side of the inverter during regenerative braking and relaxing of regenerative braking when this voltage exceeds a prescribed value. It does not work effectively for all abnormality producing factors.

SUMMARY OF THE INVENTION

The purpose of the present invention which was achieved by considering the above described situation is to provide a control apparatus for an inverter capable of continuously driving, substantially free from changes resulting from transient abnormalities produced by noise, and of displaying an adequate protective capability with respect to permanent abnormalities.

In its achievement of this purpose, the present invention is characterized in that the output of the inverter is temporarily interrupted at any point when abnormalities are produced, generation of the output of the inverter recommences free from changes after a relatively short time, for example, 1 to 2 milliseconds, and driving then continues if no abnormality is detected again and driving of the inverter is stopped only if abnormalities take place again. The action by which the output of the inverter is generated again after a relatively short time of 1 to 2 milliseconds following the initial interruption of the output of the inverter is hereinafter referred to as a retry action.

It is also possible by using timers before and after the retry action to continue driving when no abnormality is again detected within the time of, for example, 50 milliseconds and to stop the driving of the inverter only when abnormalities again occur within this period of 50 milliseconds. By this method, if abnormalities occur at any time during driving, the driving is apparently continued unless such abnormalities continue over a long period and occur at extremely short intervals. The abnormalities which result from picking up noise mainly continue for extremely short periods and are hardly ever produced at extremely short intervals. Therefore, when abnormalities are produced by picking up noise, driving can be conveniently continued as if no abnormality has been produced.

BRIEF DESCRIPTION OF THE DRAWINGS

FIG. 2 is a block diagram which shows an embodiment of the retry control circuit shown in FIG. 1.

FIG. 3 is a time chart which shows the action of the circuit shown in FIG. 2 when no abnormality occurs after the retry action.

FIG. 4 is a time chart which shows the action of the circuit shown in FIG. 2 when an abnormality occurs after the retry action.

DESCRIPTION OF THE PREFERRED EMBODIMENTS

Figure 1:
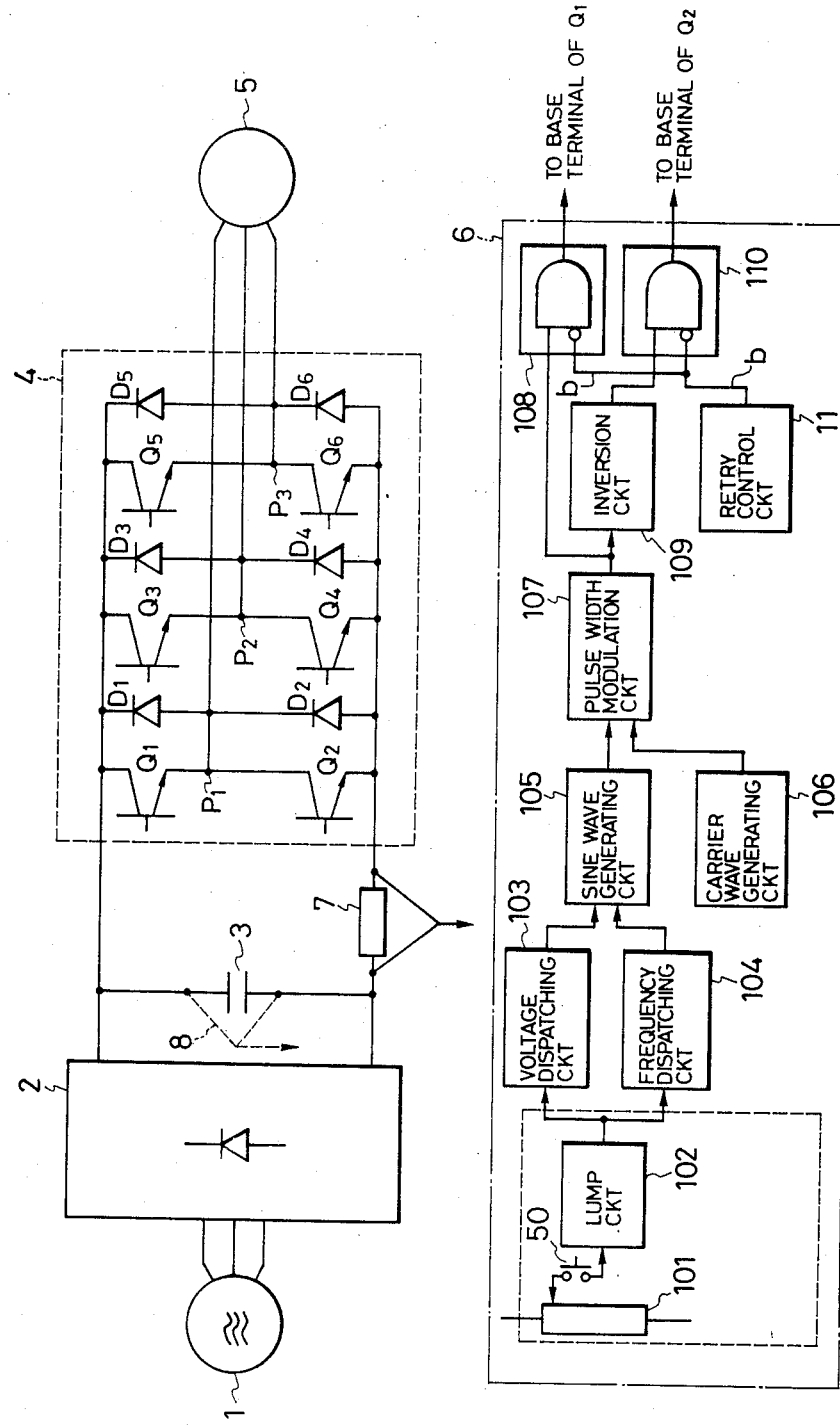
FIG. 1 is a block diagram which shows an embodiment of the electric power control apparatus of the present invention.

In FIG. 1, reference numeral 1 is a three-phase AC power source, reference numeral 2 is a power rectifier which receives electric power from the power source 1 and rectifies it, reference numeral 3 a condenser which smooths the output of the power rectifier 2, reference numeral 4 is a main circuit portion of the power inverter which receives the DC electric power smoothed by the condenser 3, converts it into three phase AC, and provides it to a load 5, reference numeral 6 is a switching control circuit which forms a portion of the power inverter, reference numeral 7 is a shunt resistance which acts as a current detector and detects the magnitude of input current of the power inverter, and reference numeral 8 is a voltage detector which detects the magnitude of the voltage of the condenser 3 at both ends thereof.

The main circuit 4 of the power inverter comprises transistors $Q_1$ to $Q_6$ as the main switching elements and flywheel elements $D_1$ to $D_6$ connected to each of the main switching elements in inverse parallel.

The transistors $Q_1$ and $Q_2$, $Q_3$ and $Q_4$, and $Q_5$ and $Q_6$ are connected in series, respectively, and the opposite ends of the respective series connections are connected to respective opposite connection points of the condenser 3. One terminal of the load 5 is connected to each of the series connecting points $P_1$, $P_2$, and $P_3$.

The switching control circuit 6 has a speed dispatching apparatus 101 therewithin and is constructed such as to control each of the main switching elements $Q_1$ to $Q_6$ so that the output voltage and output frequency of the power inverter correspond to the outputs of the speed dispatching apparatus.

That is to say, reference numeral 102 is a slow-acceleration and deceleration dispatching circuit lump circuit which softens the rapid change in output of the speed dispatching apparatus 101.

Reference numeral 103 is a voltage dispatching circuit which dispatches the magnitude of the voltage in agreement with the output of the slow-acceleration and deceleration dispatching circuit 102 and reference numeral 104 is a frequency dispatching circuit which dispatches the frequency in agreement with the output of the slow-acceleration and acceleration dispatching circuit 102.

Reference numeral 105 is a sine wave generating circuit which generates a sine wave having a frequency in agreement with the output of the frequency dispatching circuit 104 and at a voltage in agreement with the output of the voltage dispatching circuit 103 and reference numeral 106 is a carrier wave generating circuit.

Reference numeral 107 is a pulse width modulation circuit which modulates a pulse width by comparing the output of the sine wave generating circuit 105 with that of the carrier wave generating circuit 106.

Reference numeral 108 is an AND circuit which logically operates the outputs of the pulse width modulation circuit 107 and of the retry control circuit 11 and the output of this circuit becomes a base signal of the main switching element $Q_1$.

Reference numeral 109 is an inversion circuit which inverts the output of the pulse width modulation circuit 107, reference numeral 110 is an AND circuit which logically operates the outputs of the inversion circuit 109 and of the retry control circuit 11 and the output of this circuit becomes the base signal of the main switching element $Q_2$. Since the switching control for the switching elements $Q_1$ and $Q_2$ is identical for the other switching elements $Q_3$, $Q_4$ and $Q_5$, $Q_6$, description of the switching control for $Q_3$, $Q_4$ and $Q_5$, $Q_6$ is not repeated herein.

The retry control circuit 11 is constructed as shown in FIG. 2. Reference numeral 31 is a latch circuit of base breaking signal b, reference numeral 32 is a first timer circuit, reference numeral 33 is a latch circuit of the output of the first timer circuit, reference numeral 34 is a latch circuit of a retry prohibition signal g, reference numerals 35 and 36 are AND circuits, and reference numeral 37 is an OR circuit. In addition, $a_1$, $a_2$, and $a_3$ are abnormality detecting signals. The abnormality detecting signal $a_1$ among them is constructed such as to indirectly judge the temperature of the electronic thermal circuit 38 or the load 5 from the outputs of the frequency dispatching circuit 104 and the current detector 7 when the load 5 is an electric motor and to be output when it judges that the temperature rise has reached a constant value. Detailed description of the electronic thermal circuit 38 is given in the specification of U.S. Pat. No. 4,527,214. The abnormality detecting signal $a_2$ is output from a comparator 40 when the output of the current detector 7 is above the output from the command circuit 39 and the abnormality detecting signal $a_3$ is output from a comparator 42 when the output of the voltage detector 8 is above the output of the command circuit 41.

The OR circuit 37 sets the latch circuit 31 when the abnormality detecting signals $a_1$, $a_2$, and $a_3$ or the retry prohibition signal g is output. Therefore, the latch circuit 31 outputs the base breaking signal b.

The AND circuits 108 and 110 function to inhibit the base driving signal so that it is not output when the base breaking signal b is input.

The first timer circuit 32 is triggered by the signal c from the AND circuit 35 and functions to generate the pulse signal d of a relatively narrow width after a first fixed time $T_1$.

The latch circuit 33 is triggered by the pulse signal d and functions to generate a signal e which is maintained at a high level during driving.

The latch circuit 34 is set by a signal f which appears as the AND conditions of the signals b and e and functions to latch the retry prohibition signal g.

Furthermore, the latch circuit 31 of the base breaking signal b is reset by the pulse signal d which is the output of the timer circuit 32 but the latch circuit 33 and that of the retry prohibition signal g are reset when the starting button 50 (see FIG. 1) of the inverter apparatus is opened. The starting button 50 is maintained in a closed state during driving.

Next, the working of the embodiment will be explained by the time chart shown in FIG. 3.

First, FIG. 3 shows the operation when abnormalities are transiently produced by noise during the driving of the inverter. When any one of the abnormality detecting signals $a_1$ to $a_3$ rises as a result of a transient abnormality at a time $t_0$, the latch circuit 31 is set thereby, the base breaking signal b rises, and thus the output of the inverter main circuit is broken at this time $t_0$.

Since the latch circuit 33 is not driven at this time, the output signal e is at a low level, and the base breaking signal b is input to the timer circuit 32 through the AND circuit 35 thereby, so that the timer circuit 32 is triggered at the time $t_0$ and begins to measure a time $T_1$.

After the time $T_1$ has elapsed from the time $t_0$, the pulse signal d is output from the timer circuit 32 at the time $t_1$, the latch circuit 31 is reset and the base breaking signal b decays. Thus the base driving signal is again input to the inverter main circuit 4 from the AND circuits 108 and 110, and the AC output is thereby provided to the load 5 from the main circuit.

Therefore, according to this embodiment, it is possible to continue the driving in its existing state and to remove the necessity for restarting when a transient abnormality is produced by noises during driving of the inverter because in this case the AC output is temporarily broken by the base breaking but then the AC output again appears by retrying at $t_1$ after the short time $T_1$ has passed.

At this time, the shorter the time $T_1$ determined by the time constant of the timer 32, the smaller the shock experienced when retrying. However, if this time $T_1$ is too short, the inverter is retried before the abnormality subsides after the time $t_0$ when it is produced, and thus one of the abnormality detecting signals $a_1$ to $a_3$ appears again, causing the driving to the discontinued.

Therefore, the value of the time $T_1$ should be determined at a suitable figure by considering the above conditions, though it is suitable for the value to be determined at several milliseconds, for example, 1 to 2 milliseconds, from the practical point of view.

Next, FIG. 4 explains the operation when a permanent abnormality is produced by some troubles of the apparatus, and not by noises. When an abnormality is detected at the time $t_0$ and any one of the signals $a_1$ to $a_3$ appears, the base breaking is carried out by the signal b and the abnormality detecting signals $a_1$ to $a_3$ are immediately caused to decay.

Therefore, after the time $T_1$ which is established by the timer circuit 32, the pulse signal d is generated at the time $t_1$ for retry, the base breaking condition is removed, and the inverter main circuit 4 begins to generate the AC output. However, as described above, since in this case the permanent abnormality is produced at the time $t_0$, when retrying is again effected at the time $t_1$ and the inverter again starts to act, the abnormality detecting signals $a_1$ to $a_3$ appear again at the time $t_2$ slightly after the time $t_1$, the base breaking signal b rises, the retrying thus being cancelled, the base breaking is again carried out, and the AC output of the inverter becomes zero.

However, at this time, the latch circuit 33 moves after the time $t_1$ and its output signal e reaches a high level.

Therefore, in this case, the AND circuit 35 is prevented from functioning, and the AND circuit 36 is activated, whereby the base breaking signal b passes through the AND circuit 36 and becomes a signal f, the latch circuit 34 is set, the signal g rises at the time $t_2$, the signal g is latched thereafter, and resetting of the latch circuit 31 is prevented.

Thus, according to this embodiment, when the abnormality detecting signal a appears again between the base breaking triggered by the abnormality detection and by stopping driving after retrying, it is possible to prohibit retrying after the time $t_2$, to stop driving the inverter, and to adequately attain protection with respect to a permanent abnormality.

Furthermore, when driving is stopped, the starting button is opened and thus the latch circuits 33 and 34 are reset.

Figure 5:
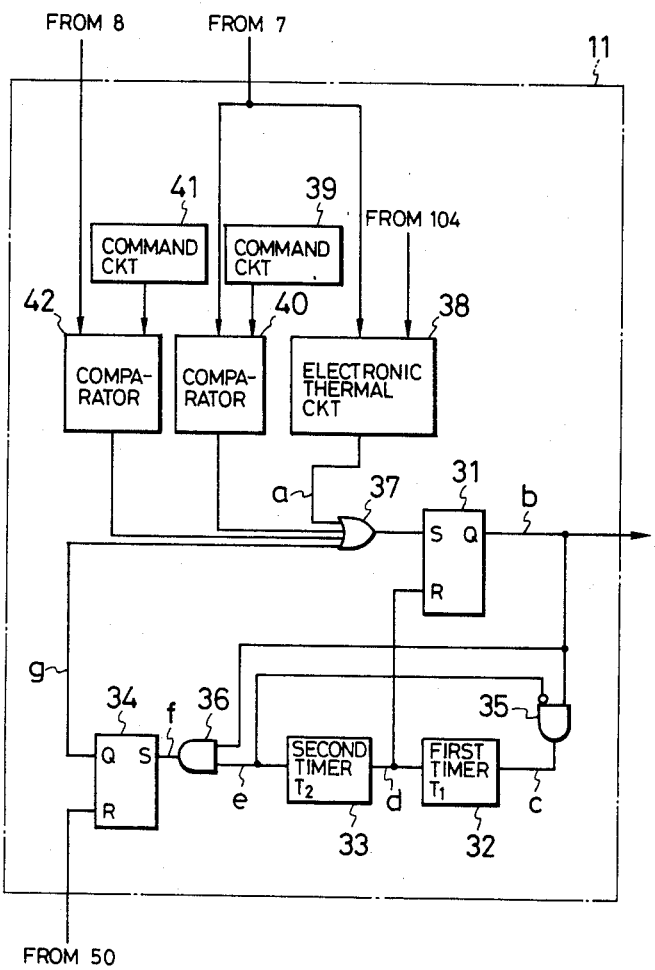
FIG. 5 is a block diagram which shows another embodiment of the retry control circuit.
Figure 6:
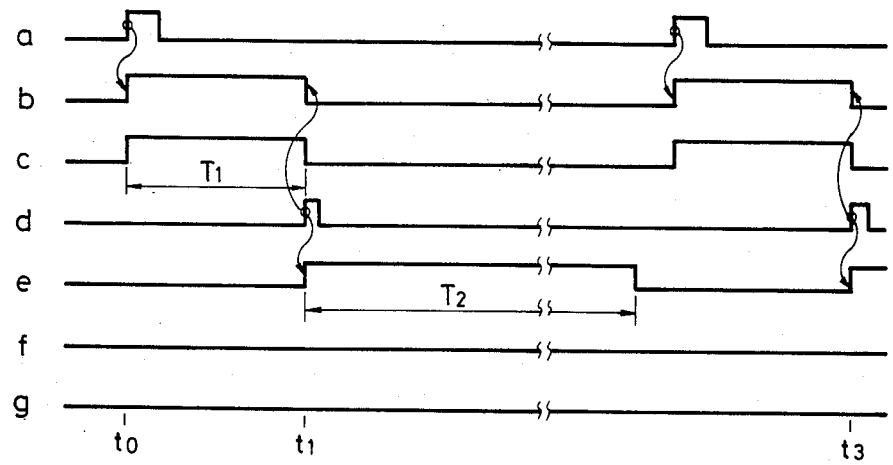
FIG. 6 is a time chart which shows the action of the circuit shown in FIG. 5 when abnormalities occur again much later after the retry action.
Figure 7:
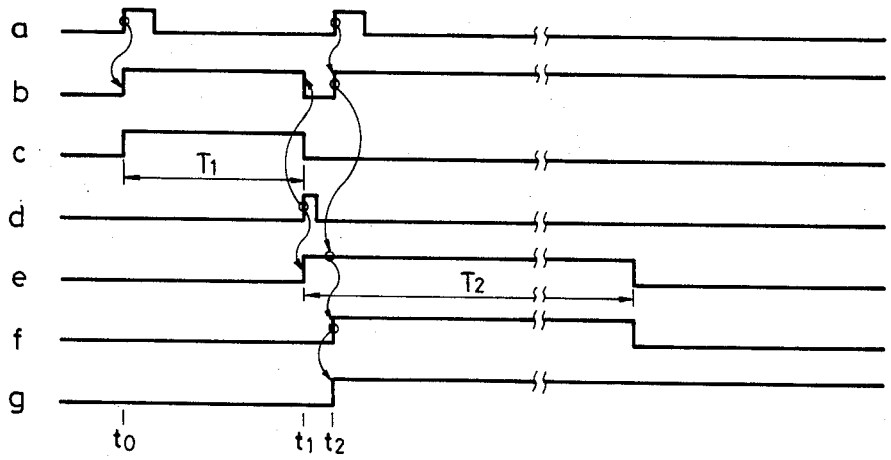
FIG. 7 is a time chart which shows the action of the circuit shown in FIG. 5 when abnormalities occur again immediately after the retry action.

FIG. 5 is another embodiment of the retry control circuit 11. The difference between what is indicated by reference numeral 6 shown in FIG. 2 and this embodiment is that a second timer circuit 33' is provided in the place of the latch circuit 33 in FIG. 2. A time $T_2$ which is maintained at a high level from the trigger time $t_1$ of the second timer 33' is established, and prevention of retrying is maintained only when the abnormality detecting signals $a_1$ to $a_3$ again appear within the time $T_2$ after the pulse signal d is generated from the timer circuit 32 in order to carry out retrying. In this manner, when any one of the abnormality detecting signals $a_1$ to $a_3$ is generated after the time $T_2$ after the retrying effected at the time $t_1$, the retrying is again carried out at the time $t_3$, as shown in FIG. 6. However, when the abnormality is again produced before the time $T_2$, such retrying is not carried out again, as shown in FIG. 7, wherein the driving of the load 5 is stopped by disengaging the starting button 50. Starting is effected by again pushing the push button 50.

Furthermore, as seen from the above description, the establishment of too long a time interval $T_2$ leads to the inability to retry in the case of production of abnormality by noise and facilitates stopping driving the inverter, while too short a time interval causes retrying to be repeated after a short time and trouble in the inverter main circuit is thereby induced. Thus, from a practical viewpoint, it is suitable to select a time interval of about ten times the time $T_1$, for example about 50 milliseconds.

Figure 8:
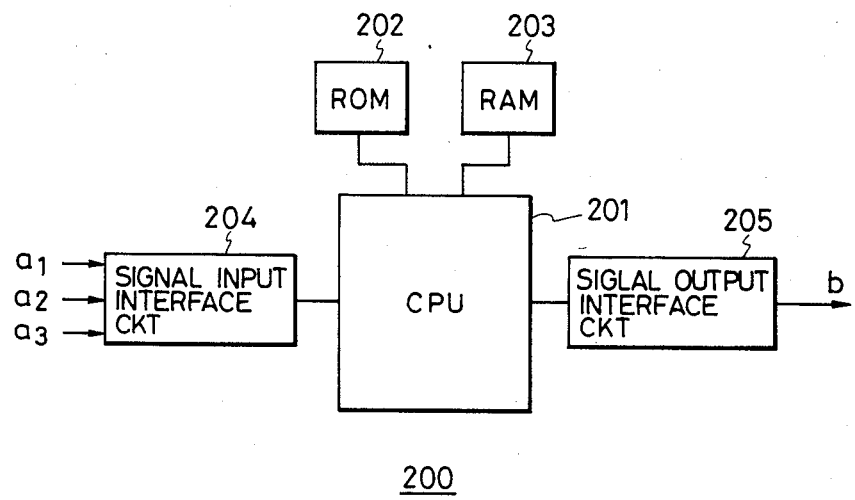
FIG. 8 is a block diagram which shows another embodiment of the retry control circuit.

The above described embodiment shows practice of the present invention as hardware. However, recently, microcomputers as shown in FIG. 8 have been used with versatility to control an inverter apparatus.

Therefore, the present invention can be practiced as one of the control programs of the inverter effected by microcomputer 200. An example of such treatment by this embodiment is shown by the flow chart in FIG. 9. This comprises the central processing unit of the microcomputer 200 (expressed as CPU hereinafter), a read only memory ROM 202 (expressed as ROM hereinafter), a random access memory RAM 203 (expressed as RAM hereinafter), a signal input interface circuit 204, and a signal output interface circuit 205.

The abnormality detecting signals $a_1$ to $a_3$ are input from the signal input interface circuit 204 and the base breaking signal b is output from the signal output interface circuit 205 to the AND circuits 108 and 110 shown in FIG. 1.

Figure 9:
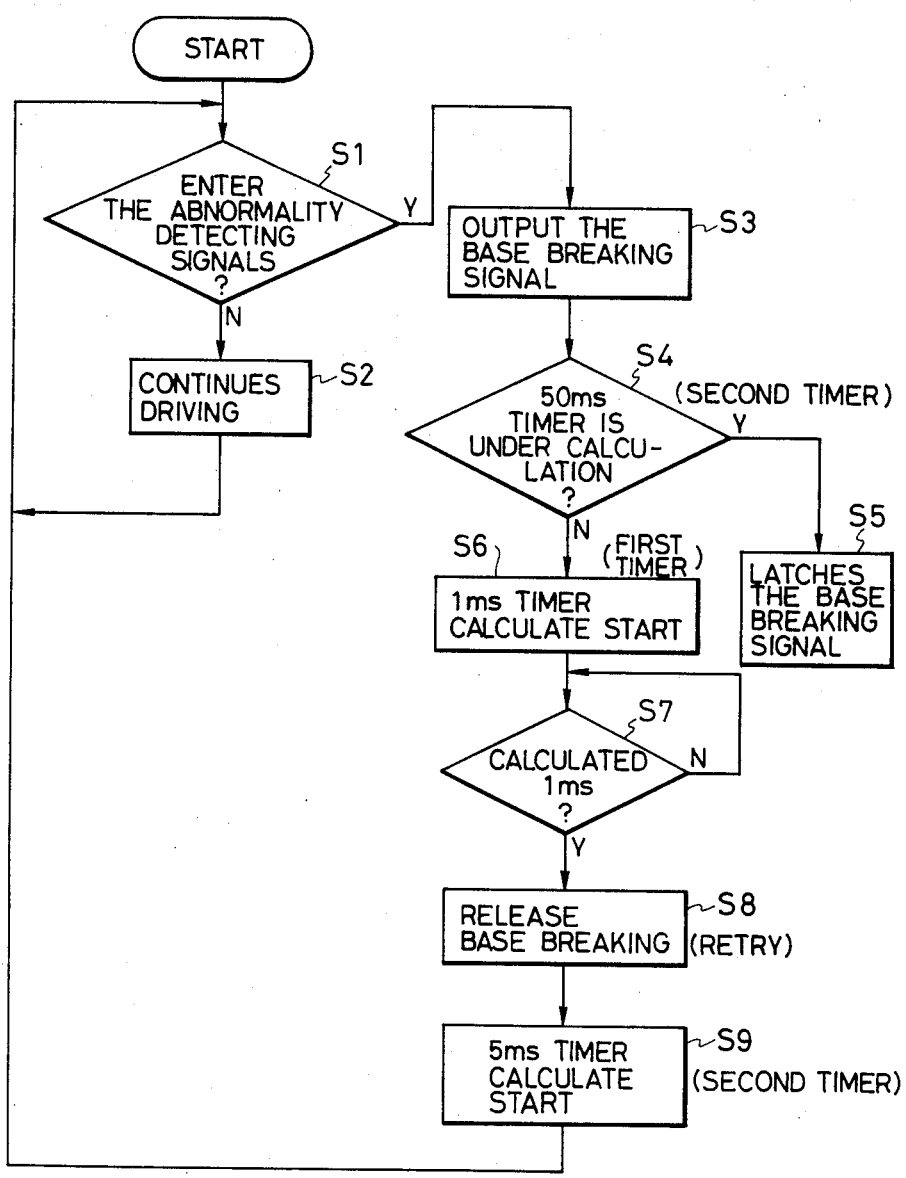
FIG. 9 is a flow chart explaining the program structure of the control circuit shown in FIG. 8.

As shown in FIG. 9, CPU assumes that the abnormality detecting signals $a_1$ to $a_3$ enter the signal input interface circuit at step S1. As a result, if the abnormality detecting signals do not enter it, the program goes to a step S2 and continues driving. The presence of the abnormality detecting signals $a_1$ to $a_3$ is observed by returning to the step S1 during driving.

As a result of the judgement at the step S1, when the abnormality detecting signals are shown, the program goes to a step S3 and immediately outputs the base breaking signal b through the signal output interface circuit 205, and the output of the inverter thereby goes OFF. Then, the program goes to step S4 and judges that the timer function corresponding to the timer 33' in the CPU is under calculation. If under calculation, the program goes to step S5 and latches the base breaking signal b. When not under calculation, the program goes to step S6 and the function corresponding to the timer 32 in the CPU starts to calculate in the same manner.

Next, the program goes to step S7 and then to step S8 after the established time corresponding to the timer 32, and the retry signal (the signal d shown in FIG. 4) is output here. Then, the program goes to a step S9 and the timer function corresponding to the timer 33' starts to calculate. Then the program returns to step S1.

In addition, the program for moving the microcomputer 200 along the flow chart shown in FIG. 9 is memorized in RAM 203 and ROM 202 is used to write data for a while for the purpose of activating the microcomputer 200 on the basis of the flow chart shown in FIG. 9.

What we claim is:

1. A retry control apparatus of an inverter comprising a power inverter which converts DC into AC and which has an AC motor connected to an output thereof, abnormality detecting means for detecting an electric abnormality at the input and/or output of said power inverter, retry means which starts when said abnormality detecting means detects an abnormality and removes an output interruption of said power inverter after a first fixed time has elapsed during rotating of said AC motor, and a signal latch means which operates by detecting again any abnormality occurring within a second fixed time after the output interruption has been removed by said retry means, so that the operation of said retry means is prevented by the output signal of said signal latch means, wherein said first fixed time is several milliseconds and said second fixed time is at least more than ten times the first fixed time.

2. A method for control of a power inverter which converts DC into AC and has an AC motor connected to an output thereof, comprising the steps of:
   enabling drive of the power inverter;
   detecting an abnormality of the power inverter;
   interrupting drive of the power inverter upon detection of an abnormality;
   initiating a first fixed time interval upon detection of the abnormality;

initiating a second fixed time interval longer than the first fixed time interval after elapse of the first fixed time interval;

removing the interruption of the drive of the power inverter and enabling drive of the power inverter upon elapse of the first fixed time interval during rotating of the AC motor;

detecting the occurrence of an abnormality during the second fixed time interval and enabling drive of the power inverter if no abnormality is detected and stopping drive of the power inverter if an abnormality is detected during the second fixed time interval so as to prevent drive of the power inverter, and upon detecting the occurrence of an abnormality after elapse of the second fixed time interval, repeating the interruption of the drive of the power inverter and initiation of the first and second fixed time intervals.

* * * * *